United States Patent
Larsen et al.

(10) Patent No.: US 7,871,195 B2
(45) Date of Patent: Jan. 18, 2011

(54) MIXING DEVICE CONFIGURED TO BLEND FOOD

(75) Inventors: Atle Larsen, Richmond, VA (US); Ernest B. Pryor, Jr., Glen Allen, VA (US); Mark C. Steiner, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 751 days.

(21) Appl. No.: 11/581,725

(22) Filed: Oct. 16, 2006

(65) Prior Publication Data

US 2008/0089170 A1    Apr. 17, 2008

(51) Int. Cl.
*B01F 7/16*    (2006.01)
*B01F 15/00*    (2006.01)

(52) U.S. Cl. .................. 366/194; 366/197; 366/199; 366/205; 366/314

(58) Field of Classification Search ......... 366/197–207, 366/194, 314; 251/309; 137/15.24, 315.25, 137/315.26
See application file for complete search history.

(56) References Cited

U.S. PATENT DOCUMENTS

| | | | |
|---|---|---|---|
| 516,438 A | 3/1894 | Faucet | |
| 1,874,079 A | 7/1929 | Black | |
| 2,017,139 A | 10/1935 | Wise Wood | |
| 2,134,261 A | 10/1937 | Oswell | |
| 2,247,976 A | 7/1941 | Titus | |
| 2,315,018 A | 3/1943 | Lawrence | |
| 2,463,697 A | 3/1949 | Kipper | |
| 2,795,392 A * | 6/1957 | Stichler et al. | 251/97 |
| 3,066,908 A * | 12/1962 | Floren et al. | 251/287 |
| 3,168,280 A * | 2/1965 | Mueller | 251/309 |
| 3,257,096 A * | 6/1966 | Floren et al. | 251/287 |
| 3,386,700 A | 6/1968 | Greene et al. | |
| 4,298,183 A | 11/1981 | Kawakami | |
| 4,339,639 A | 7/1982 | Valbona | |
| 4,351,612 A | 9/1982 | Valbona | |
| 4,518,263 A | 5/1985 | Brym | |
| 4,720,076 A | 1/1988 | Hyde | |
| 4,822,175 A | 4/1989 | Barnard | |
| 5,183,182 A | 2/1993 | Comstock | |
| 5,344,234 A | 9/1994 | Caveza | |
| D390,416 S | 2/1998 | Hippen et al. | |
| D400,757 S | 11/1998 | Hippen et al. | |
| 5,960,701 A | 10/1999 | Reese | |
| D417,581 S | 12/1999 | Barthelemy | |
| D434,596 S | 12/2000 | Naft et al. | |
| D440,813 S | 4/2001 | Gort-Barten | |
| D444,995 S | 7/2001 | Thackray | |
| D445,635 S | 7/2001 | Gort-Barten | |
| 6,431,744 B1 | 8/2002 | Ash | |

(Continued)

OTHER PUBLICATIONS

Office Action, issued May 10, 2010, in related U.S. Appl. No. 11/683,091, 19 pages.

*Primary Examiner*—Tony G Soohoo
(74) *Attorney, Agent, or Firm*—Panitch Schwarze Belisario & Nadel LLP (57) ABSTRACT

A mixing device configured to blend food. The mixing device includes a base enclosing a motor. A jar is removably mounted to the base for containing food. A collar is removably mounted between the base and the jar. A dispensing spout is removably mounted to the collar. Further, a splash guard is removably mounted to the base.

10 Claims, 12 Drawing Sheets

U.S. PATENT DOCUMENTS

| | | |
|---|---|---|
| 6,457,614 B1 | 10/2002 | Amidzich |
| 6,527,433 B2 | 3/2003 | Daniels, Jr. |
| D473,099 S | 4/2003 | Yamamoto et al. |
| D473,421 S | 4/2003 | Daniels, Jr. |
| D474,065 S | 5/2003 | Daniels, Jr. |
| 6,595,121 B1 | 7/2003 | Chang Chien |
| D483,607 S | 12/2003 | Chang Chien |
| D499,602 S | 12/2004 | Feil |
| 6,837,153 B1 | 1/2005 | Chang Chien |
| D504,277 S | 4/2005 | Hei |
| 6,966,689 B2 | 11/2005 | Daniels, Jr. |
| D512,265 S | 12/2005 | McCurrach |
| 2002/0009016 A1 | 1/2002 | Ancona |
| 2003/0099154 A1 | 5/2003 | Daniels, Jr. |
| 2005/0174884 A1 | 8/2005 | Farrell |
| 2005/0185507 A1 | 8/2005 | Beesley et al. |
| 2005/0199534 A1 | 9/2005 | Daniels, Jr. |
| 2005/0207270 A1 | 9/2005 | Beesley |
| 2006/0140050 A1 | 6/2006 | Lee Tsao Chiang |
| 2006/0176765 A1 | 8/2006 | Pryor, Jr. et al. |
| 2008/0089171 A1 | 4/2008 | Larsen et al. |

* cited by examiner

MIXING DEVICE CONFIGURED TO BLEND FOOD

BACKGROUND OF THE INVENTION

The present application is directed to a mixing device configured to blend food and, more particularly, to a mixing device or blender that includes a removably mounted dispensing spout and a removably mounted splash guard that encloses a storage space.

Mixing devices or blenders are a relatively common household or kitchen appliance that are used to blend foodstuff, typically drinks or other foodstuff that is blended into a semi-fluid state. A typical blender includes a base that encloses a motor housing and a container comprised of a jar and a mixing assembly. The base includes a blending tool rotatably mounted thereto. The blending tool is rotatably engageable with a drive shaft of the motor in an operating configuration. More recently it has become popular to provide the blending jar or collar with a spout having a plunger-type valve. The spout is used to dispense "smoothie" type products. That is, a foodstuff is placed into the container and the container is engaged with the base. The foodstuff is blended and a handle of the spout is positioned to raise the plunger-type valve to dispense or pour the blended foodstuff from base of the container.

When dispensing blended foodstuff through a spout, the foodstuff inside the spout can leave quit a mess. It would be desirable to remove the spout from the blender after blending the foodstuff. This would allow a user to more easily clean the spout before either using the blender for other foodstuff or storing the blender. In the same sense, it would be desirable to remove the valve housed inside the spout so that the valve can be properly cleaned before either storage or its next use.

When using a conventional mixing device or blender, blended foodstuff often escapes from inside the container either through the top of the jar or through the spout and splashes on the exterior of the mixing device. It would be desirable to include a removably mounted splash guard on the front of the base of the blender to prevent the front of the blender from accumulating splashed or spilled foodstuff. The splash guard may be positioned on the front of the base of the blender under the spout such that spilled or splashed blended foodstuff does not collect on the base of the blender. It would be desirable if the splash guard was removably mounted to the base so that the splash guard could be cleaned separately from the dispensing blender.

Further, blenders often come with various small parts, components or accessories that enhance a user's experience of the blender. Typically, such small parts are stored loosely with the blender and are often lost as a result. It would be desirable to further provide a self-storage space inside the blender, separate from the areas used to blend the foodstuff. This storage space would allow a user to keep small, ancillary components of the blender in a place that is easily assessable but not obstructive to the normal use of the blender.

BRIEF SUMMARY OF THE INVENTION

Briefly stated, the present invention is directed to a mixing device configured to blend food. The device includes a base housing a motor. A jar is removably mounted to the base for containing food. A collar is removably mounted between the base and the jar. The collar includes a blending tool operatively engaged with the motor when positioned on the base. A dispensing spout is removably mounted to one of the collar and the jar. The dispensing spout includes a gate valve positioned therein. The gate valve is movable between a first position wherein food flows through the dispensing valve and a second position where food is prevented from flowing through the gate valve. The gate valve is removably mounted to the dispensing spout.

In another aspect, the present invention is directed to a mixing device configured to blend food. The device includes a base housing a motor. A jar is removably mounted to the base for containing food. A collar is removably mounted between the base and the jar. The collar includes a blending tool operatively engaged with the motor when positioned on the base. A splash guard is removably mounted to the base.

In yet another aspect, the present invention is directed to a mixing device configured to blend food. The device includes a base housing a motor. The base has a recessed area. A jar is removably mounted to the base for containing food. A collar is removably mounted between the base and the jar. The collar includes a blending tool operatively engaged with the motor when positioned on the base. A splash guard is removably mounted to the base. The splash guard covers the recessed area of the base, wherein a space defined by the recessed area of the base and the splash guard provides storage for other blender components.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention described in the present application, there is shown in the drawings, an embodiment which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the dispensing blender and designated parts thereof. The terminology includes the above-listed words, derivatives thereof and words of similar import.

Referring now to the drawings in detail, wherein like numerals are used to indicate like elements throughout, there is shown in FIGS. 1-13 a first preferred embodiment of a mixing device, generally designated 10, configured to blend food (not shown). The mixing device 10 is preferably in the form of a conventional kitchen blender, but could be other products such as a food processor or smoothie machine. The mixing device 10 includes a base 12 housing a motor 14. The base 12 has an outer housing 16 which is preferably formed of high strength, light weight material, such as a polymeric material. The outer housing 16 is used to contain the motor 14 and other operational elements of the blender well understood by those of ordinary skill in the art. The outer housing 16 includes vent openings 18 in the base thereof and an electrical cord 20 for providing power to the motor 14. The outer housing 16 also includes a series of push buttons 22 used for controlling the operation and speed of the motor 14, in a manner well understood by those of ordinary skill in the art. The base 12 preferably includes a series of feet 24 for providing the mixing device 10 with stability.

Figure 5:
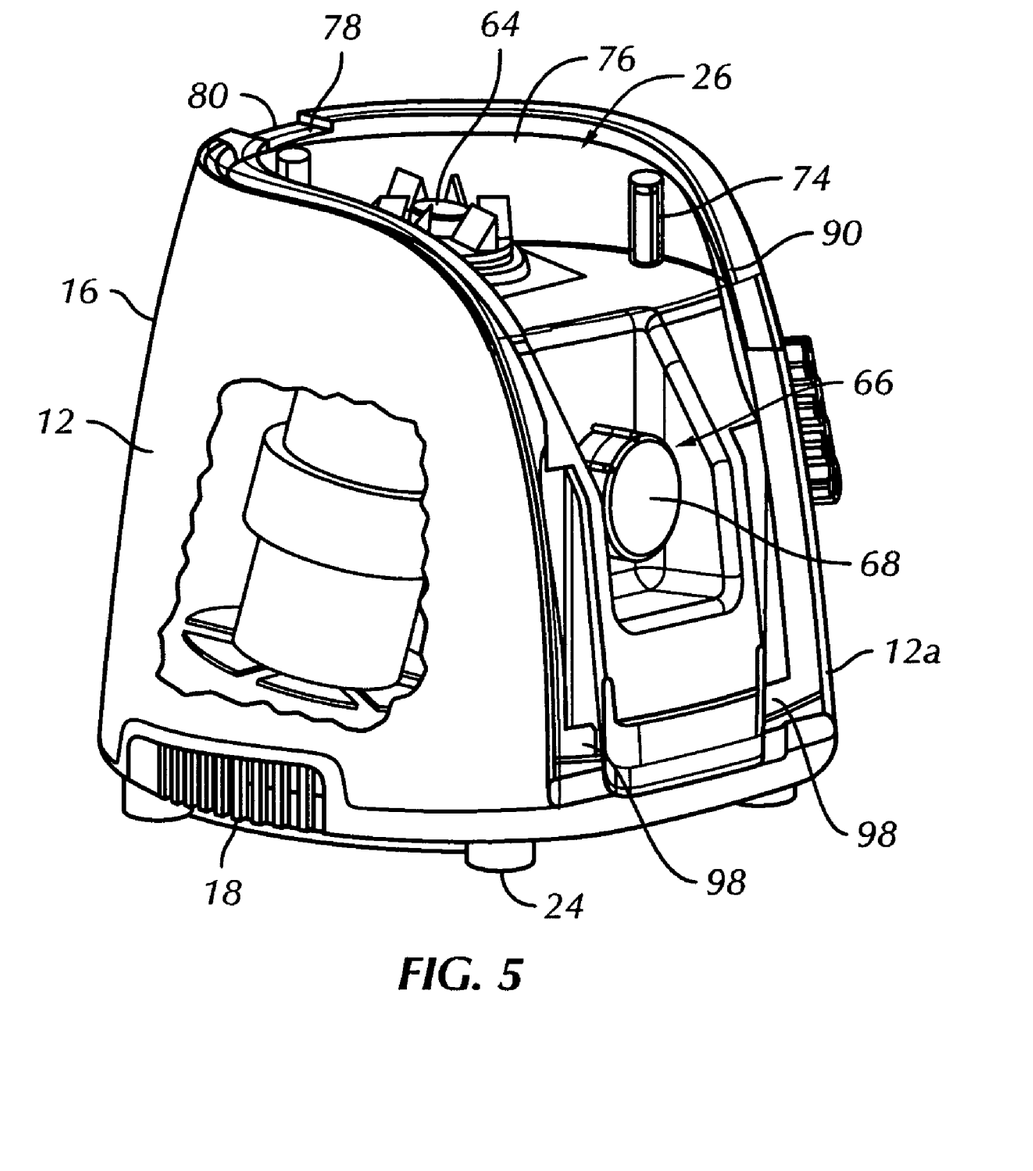
FIG. 5 is a front perspective view of the base of the mixing device shown in FIG. 1.
Figure 10:
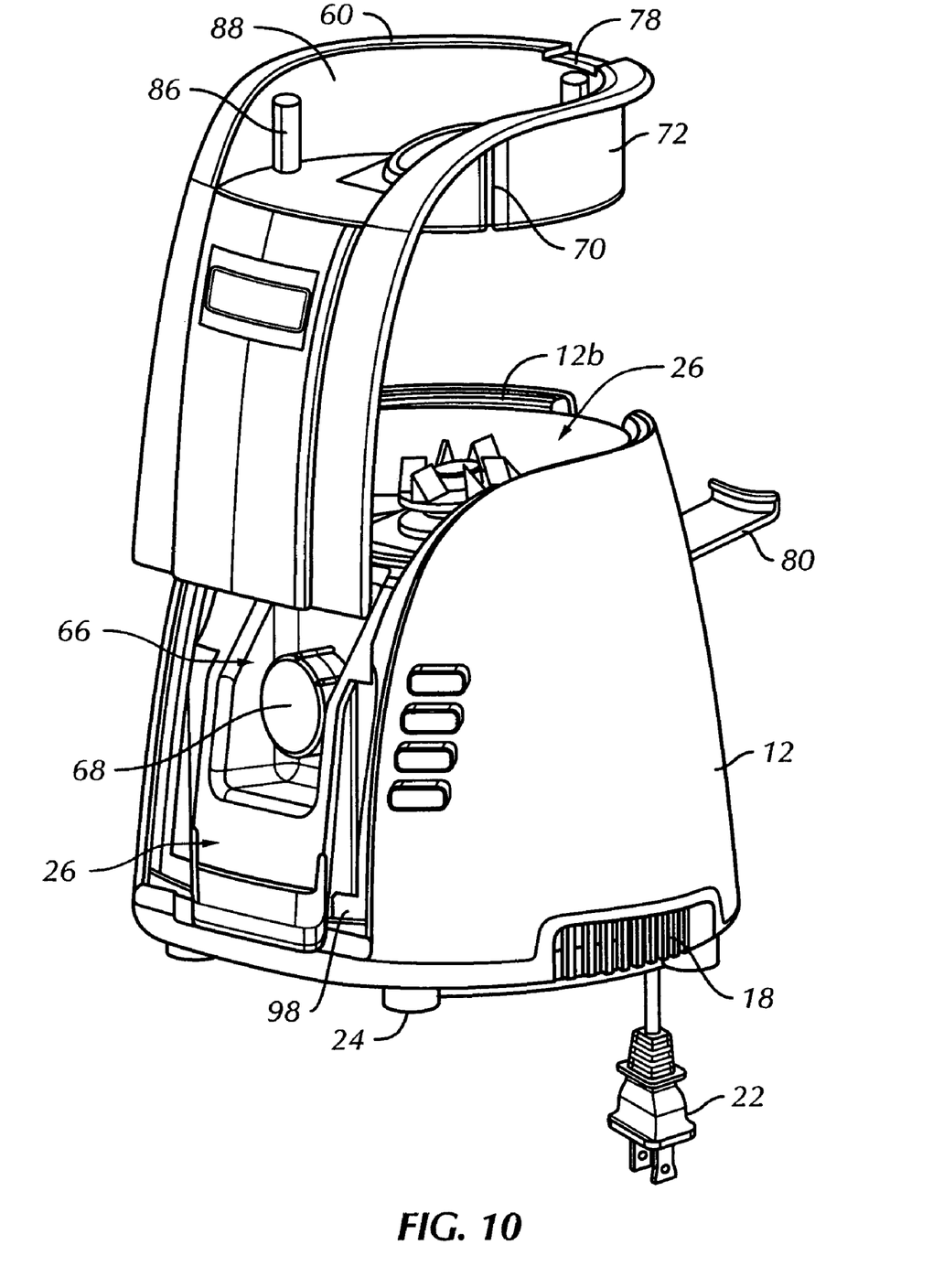
FIG. 10 is an exploded perspective view of the splash guard and base.

In reference to FIGS. 5 and 10, the base 12 includes a recessed area 26. The recessed area 26 extends from one side of the base 12, preferably the front 12a, to a top 12b of the base 12 and generally covers the front width of the base 12. A conventional clutch 64 is positioned near the top of the recessed area 26. The clutch 64 is driven by the motor 14. A storage area 66, located in the recessed area 26, provides a location to store a cap 68. An aligning groove 90 runs along a perimeter of the recessed area.

In the preferred embodiment, a jar 28 is removably mounted to the base 12. The jar 28 is open at the top and shaped to contain food for blending. The jar 28 is preferably formed of high strength, light weight material, such as a polymeric material. However, it is understood by those skilled in the art that the jar 28 could be formed of a variety of materials, such as glass or other similar material. The jar 28 has a lid 92 to enclose the open end of the jar 28 and keep blended foodstuff in the jar 28. A blending tool 94 in the interior of the base 12 is operatively connected to the motor 14 to blend the foodstuff. The blending tool 94 is preferably in the form of a series of sharp blades 94a which are driven by the clutch 64. The jar 28 includes a handle 30 which allows the jar to be easily removed from the base 12. The handle 30 of the jar 28 is preferably permanently attached to the jar 28 or pivotally attached to the jar 28. The handle 30 allows the jar 28 to be easily removed from the base 12. It is understood by those skilled in the art that the jar 28 is not required to have a handle 30. For instance, the user could merely grab the jar 28 with the palm of their hand and remove the jar 28 from the base 12.

Figure 1:
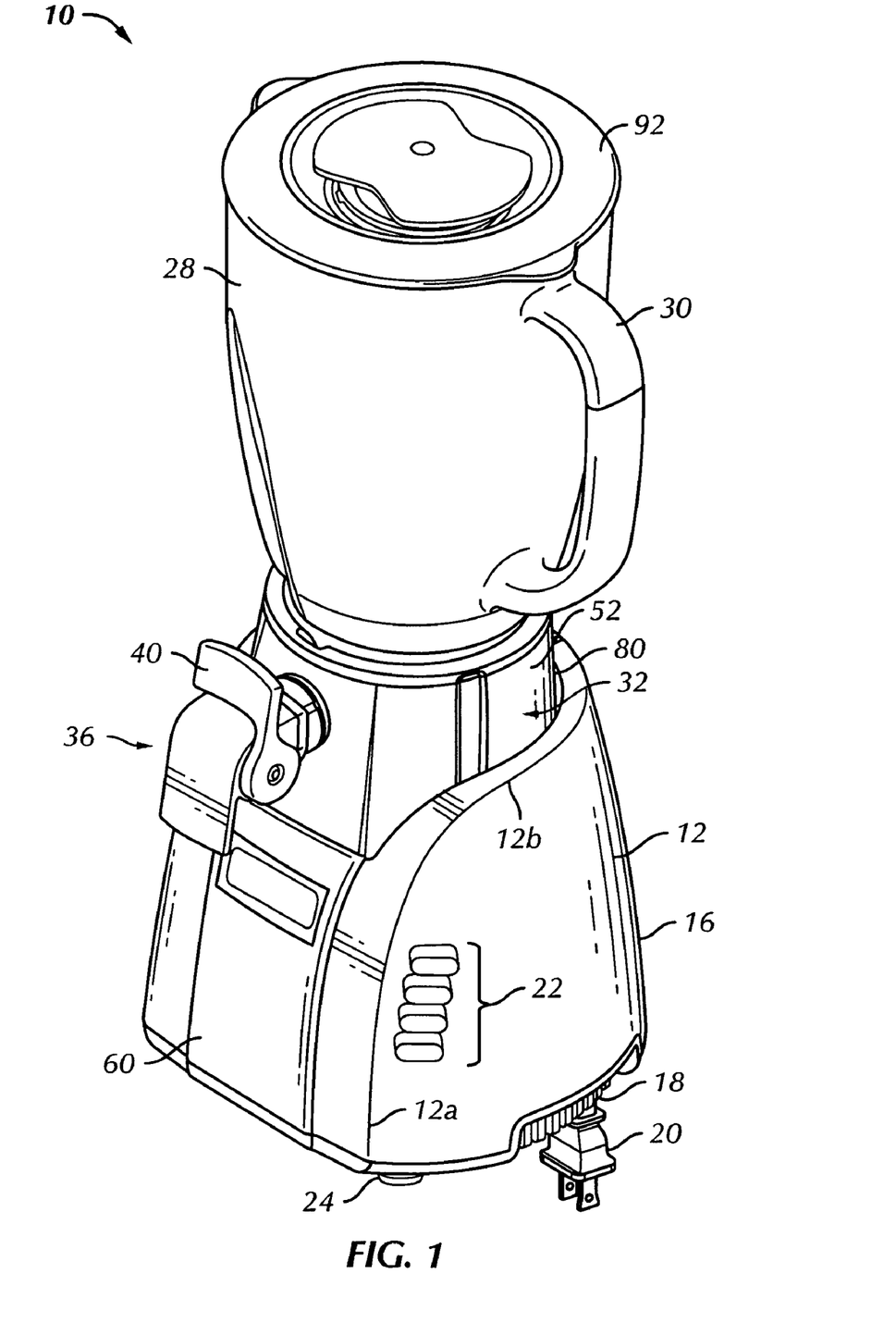
FIG. 1 is a perspective view of a preferred embodiment of a mixing device in accordance with the present invention.
Figure 2:
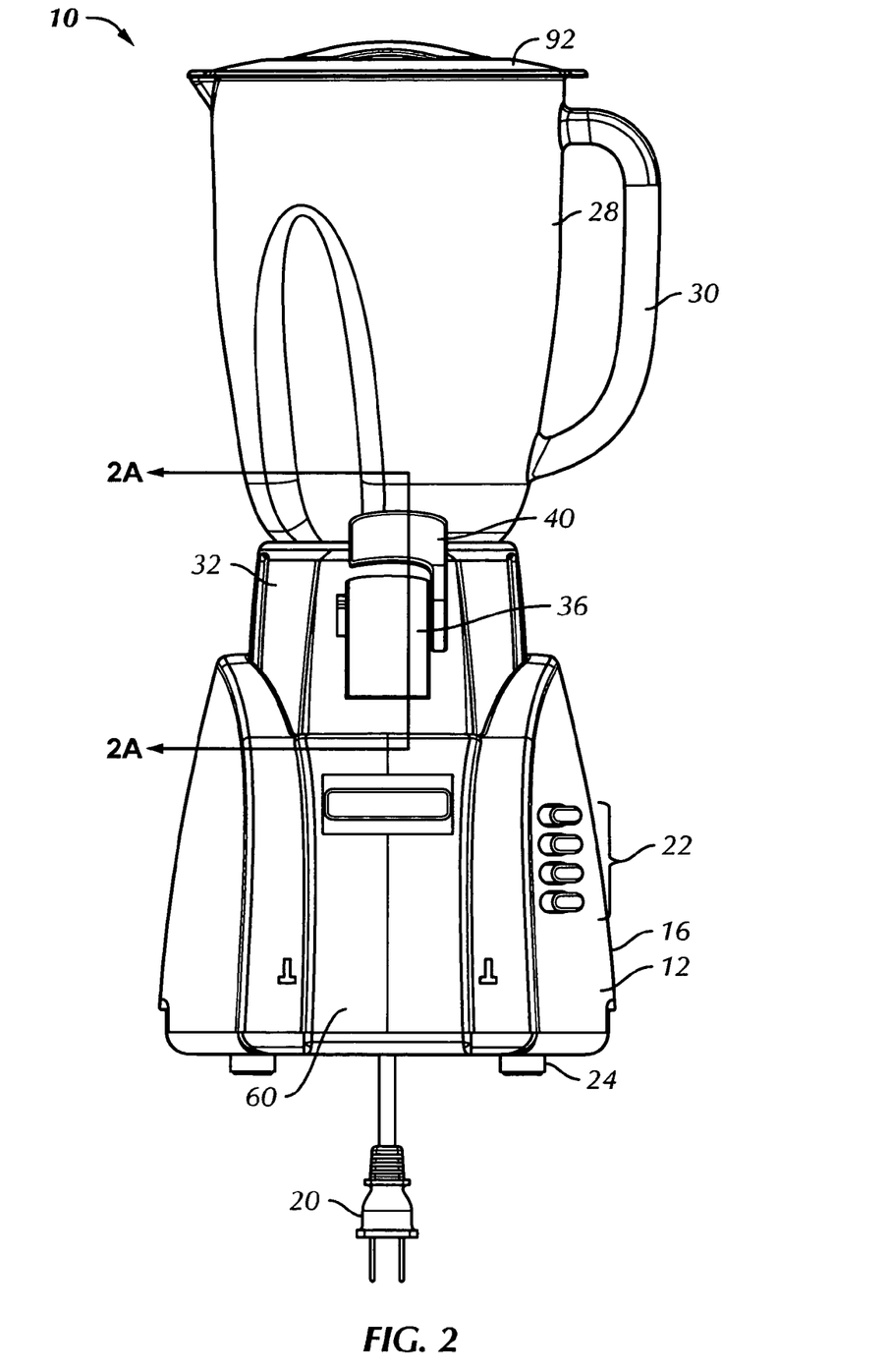
FIG. 2 is a front elevation view of the mixing device shown in FIG. 1.
Figure 2A:
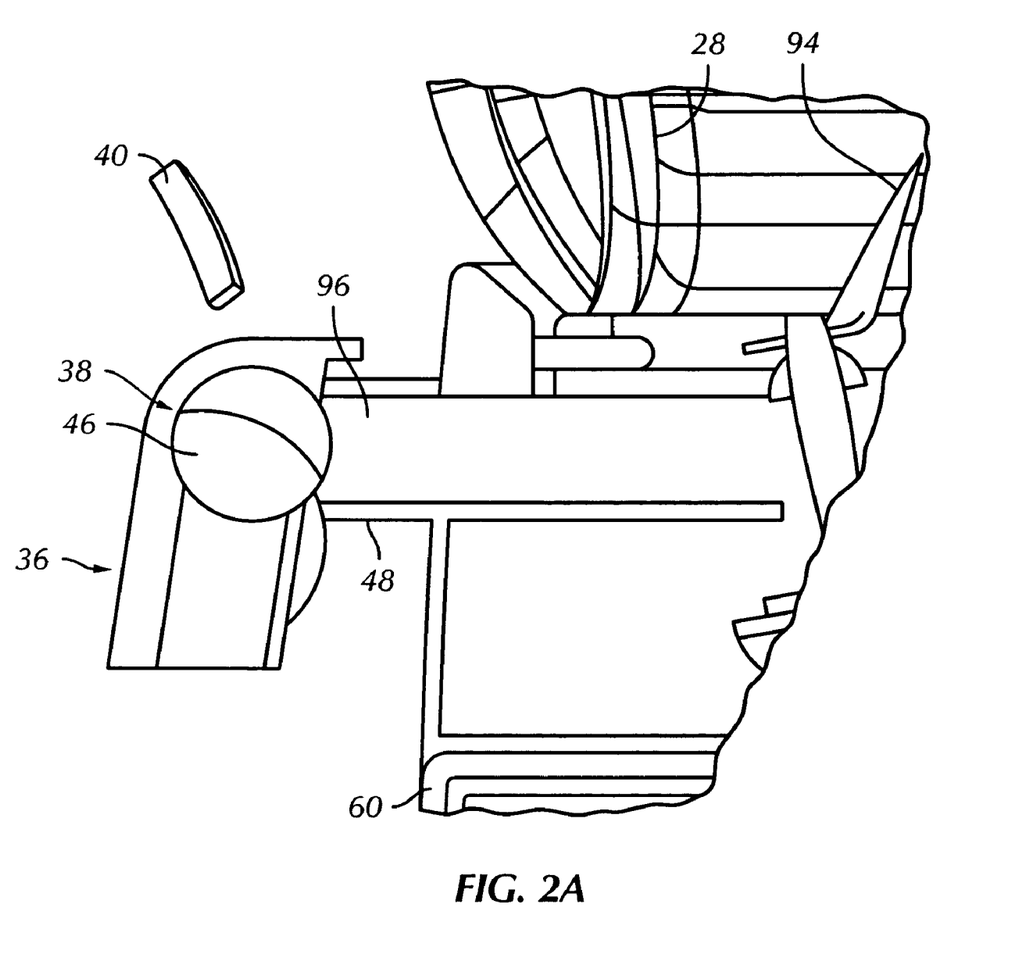
FIG. 2A is a cross-sectional view of the mixing device shown in FIG. 2, taken along line 2A-2A of FIG. 2.
Figure 6:
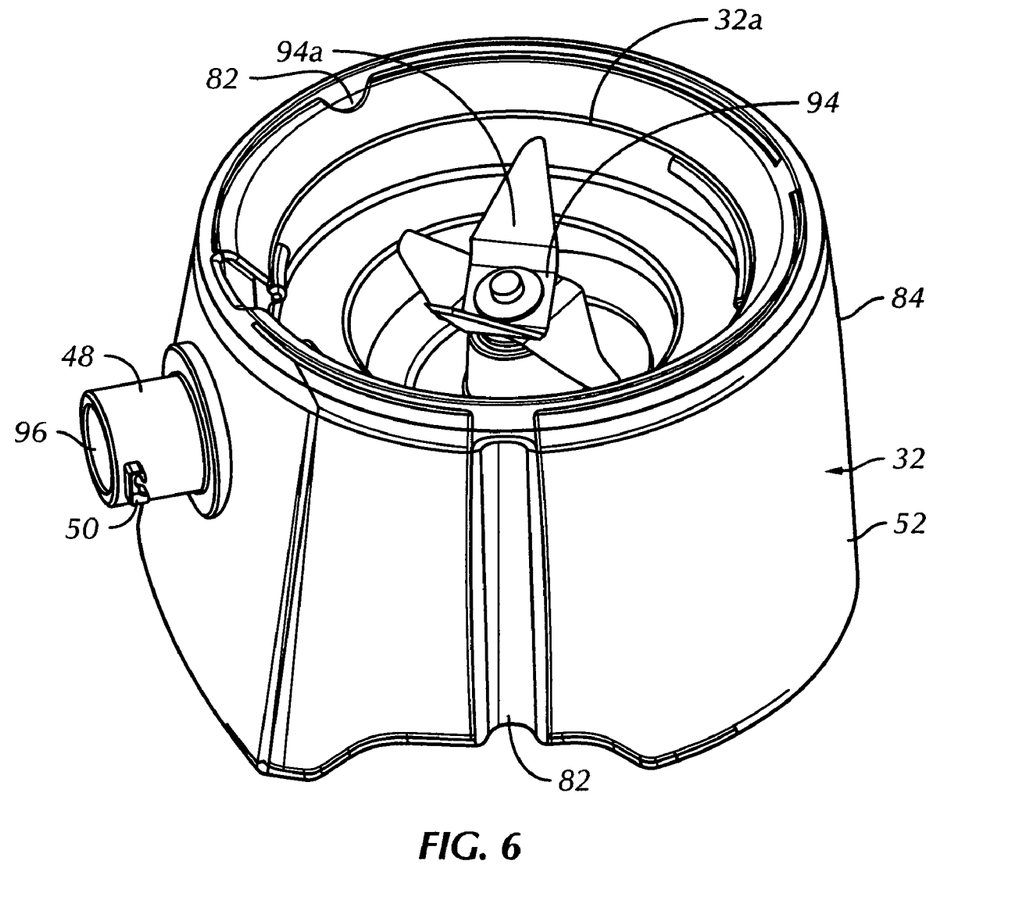
FIG. 6 is a right side perspective view of a collar of the mixing device shown in FIG. 1.

Referring now to FIGS. 1 and 6, a collar 32 is removably mounted between the base 12 and the jar 28. The collar 32 has an outer housing 52 that is preferably formed of high strength, light weight material, such as a polymeric material. The interior of the collar 32 includes a series of threads 32a for securing the collar 32 to the bottom of the jar 28. The blending tool 94, positioned within the collar 32, is operatively engaged with the motor 14 when the jar 28 is position on the base 12. That is, the operation of the clutch 64 on the base 12 in connection with the blending tool 94 of the jar 28 is well understood by those skilled in the art and, therefore, further description thereof is a matter for purposes of convenience only and is not limiting. As described in more detail hereinafter, a dispensing tube 48 projects from a side of the collar 32. The dispensing tube 48 includes locking keys 50 on the exterior periphery of the dispensing tube 48. The dispensing tube 48 is in fluid communication with the interior of the collar 32 and jar 28.

Figure 11:
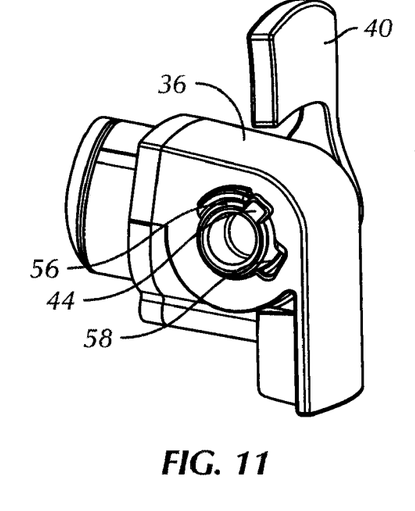
FIG. 11 is an enlarged perspective view of a dispensing spout with a dispensing handle in a closed position.
Figure 12:
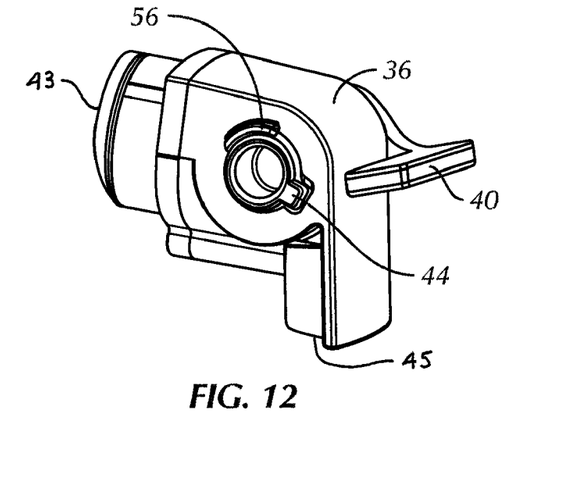
FIG. 12 is a greatly enlarged perspective view of the dispensing spout with the dispensing handle in an open position.
Figure 13:
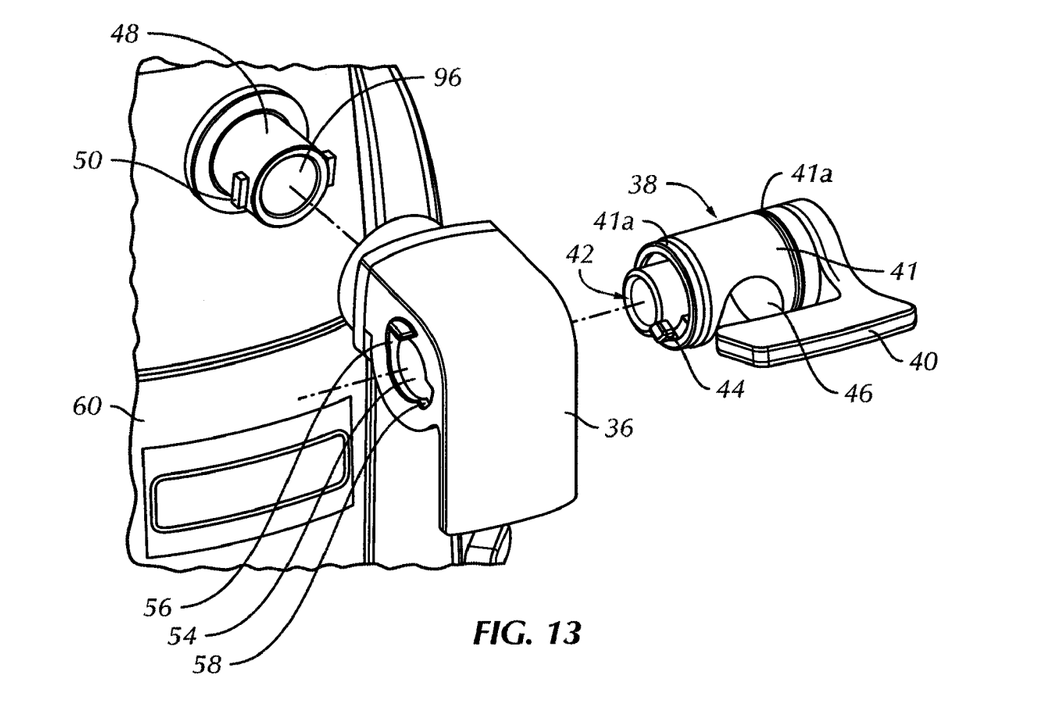
FIG. 13 is an exploded view of the dispensing spout and a gate valve.

In reference to FIGS. 11-13, a dispensing spout 36 is removably mounted to one of the collar 32 and the jar 28. The dispensing spout 36 includes an inlet 43 (FIG. 12), an outlet 45 (FIG. 12), and a gate valve 38. The gate valve 38, positioned in the dispensing spout 36, is movable between a first position, as seen in FIG. 12, where food flows through the gate valve 38 and a second position, as seen in FIG. 11, wherein food is prevented from flowing through the gate valve 38. The dispensing spout 36 further includes a dispensing handle 40. The dispensing handle 40 is secured to the gate valve 38 for moving said gate valve 38 between the first and second positions. A valve bore 54 extends across the width of the dispensing spout 36. A generally arcuate stopper rib 56 is positioned at a periphery of one side of the valve bore 54 and a radially extending key slot 58 extends outwardly from a periphery of the valve bore 54.

The gate valve 38 includes a generally cylindrical seat 41 sized to complementary fit within the valve bore 54. The seat 41 includes O-rings 41a positioned at opposite ends of the seat 41 to sealingly position the seat 41 within the valve bore 54. The dispensing handle 40 is located at one end of the seat 41. A hub 42 is located on a side of the seat 41 opposite the handle 40. As described in more detail hereinafter, the gate valve 38 is removably retained in the dispensing spout 36 with a key and slot arrangement. That is, an alignment key 44 extends from a peripheral edge of the hub 42. The seat 41 also includes a dispensing groove 46 in one side thereof to control the flow of blended foodstuff through the dispensing spout 36.

To assemble the gate valve 38 in the dispensing spout 36, the user would align the alignment key 44 of the gate valve 38 with the key slot 58 of the dispensing spout 36. The gate valve 38 then slides into the valve bore 54 of the dispensing spout 36. A user then grasps the handle 40 connected to the gate valve 38 and moves the handle 40 upwards towards the jar 28. During this motion of the handle 40, the alignment key 44 moves in a circular path along the exterior side of the dispensing spout 36 until the alignment key 44 comes into abutting contact with the stopper rib 56. In this position as seen in FIG. 11, the gate valve 38 is in this closed position. When the gate valve 38 is in this closed position, the dispensing groove 46 is out of alignment with an outlet 96 of the dispensing tube 48 of the collar 32. Food is therefore prevented from flowing through the dispensing spout 36. In the position as seen in FIG. 12, the gate valve 38 is in the open position. To move the gate valve 38 from the closed position to the open position, the user grasps the handle 40 and moves the handle 40 downward away from the jar 28. During this motion of the handle 40, the alignment key 44 moves in a circular path along the exterior side of the dispensing spout 36 away from the stopper rib 56. In this open position, the dispensing groove 46 is in alignment with the outlet of the dispensing tube 48 of the collar 32. Food is therefore permitted to flow through the dispensing spout 36.

To remove the gate valve 38 from the dispensing spout 36, the user moves the handle 40 of the gate valve 38 away from the jar 28 as shown in FIG. 12. When the alignment key 44 of the gate valve 38 reaches the key slot 58 of the dispensing spout 36, the user can easily remove the gate valve 38 from the valve bore 54 of the dispensing spout 36 by sliding the gate valve 38 axially out of the dispensing spout 36. The ability to either insert the gate valve 38 into the dispensing spout 36 or remove the gate valve 38 from the dispensing spout 36 allows a user to easily clean these parts of the mixing device 10 in preparation for storage or further blending of food.

Referring now to FIGS. 11 and 13, the dispensing spout 36 is preferably removably mounted on the dispensing tube 48 of the collar 32. Preferably, the inlet 43 of the dispensing spout 36 is sized and shaped to receive at least a portion of the dispensing tube 48 therein. The dispensing spout 36 preferably includes a fastening mechanism (not shown) that mates with locking keys 50 on the exterior periphery of the dispensing tube 48 which extends from the collar 32. The dispensing tube 48 is generally hollow and is in communication with the interior of the collar 32. The preferred fastening mechanism between the dispensing spout 36 and the dispensing tube 48 permits twist-locking of the dispensing spout 36 to the collar 32. Specifically, the most preferred fastening mechanisms permit engaging and disengaging of the dispensing spout 36 relative to the collar 32 by one-quarter twist engagement. One-quarter twist engagement is preferred such that the dispensing spout 36 is quickly and easily removable from the collar 32, when compared to a threaded fastening mechanism that may require multiple rotations or twists to engage and/or disengage the dispensing spout 36 from the collar 32. However, the fastening mechanisms are not limited to one-quarter twist engagements and may be comprised of nearly any fastening device that permits removable mounting of the dispensing spout 36 relative to the collar 32. In addition, one having ordinary skill in the art will realize that the dispensing spout 36 may be fixed to the collar 32. In the embodiment shown in FIGS. 1-13, blended foodstuff would flow from the jar 28, through the dispensing tube 48 of the collar 32, into the dispensing spout 36, through the dispensing groove 46 of the gate valve 38, and out of the dispensing spout 36. One skilled in the art would recognize that the dispensing spout 36 could alternatively be removably attached to a dispensing spout (not shown) of the jar 28 without departing from the scope of the invention.

Referring to FIGS. 1, 2, 5, 7 and 10, a splash guard 60 is removably mounted to an exterior of the base 12. The splash guard 60 is shaped to align with and complimentary cover the recessed area 26 of the base 12. The splash guard 60 is preferably formed of a high strength, light weight material, such as a polymeric material. A top portion of the splash guard 60 contains a hole 62 through which the clutch 64 of the base 12 passes through. Two equidistantly spaced vertical alignment slots 70 are located on an exterior surface 72 of the splash guard 60 which complimentary engage two vertical alignment ridges 74 on an interior surface 76 of the outer housing 16 of the base 12. While two alignment slots 70 and ridges 74 are preferred, the present invention is not limited to any particular number of slots 70 and ridges 74. Further, a lock groove 78 on an upper perimeter of the splash guard 60 couples to a latch 80 located on the back surface 12c of the base 12 when the splash guard 60 is mounted to the base 12. The latch 80 removably secures the splash guard 60 to the exterior of the base 16.

In operation the splash guard 60 is configured to lock or snap-fit onto the front 12a and top 12b of the base 12. To mount the splash guard 60 to the base 12, a user aligns the vertical alignment slots 70 on the exterior surface 72 of the splash guard 60 with the vertical alignment ridges 74 on the interior surface 76 of the base 12 the splash guard 60. The user then moves the splash guard 60 downward until it is flush with the front 12a and top 12b of the base 12. The splash guard 60 is snap-fitted to the base 12 when an outer perimeter of the splash guard 60 interferingly fits with the aligning groove 90 of the base 12. Further, slots 98, preferably provided on a lower end of the front 12a of the base 12, engage hooks (not shown) that protrude from a lower inside surface of the splash guard 60 when the splash guard 60 is mounted to the base 12. Those skilled in the art would recognize that other snap-fitting means, such as clips or prongs, can be used to snap-fit the splash guard 60 to the base 12. The splash guard 60 is locked to the base 12 when the latch 80 of the base 12 locks to the lock groove 78 of the splash guard 60. The latch 80 locks onto the lock groove 78 when a tongue 80a of the latch 80 slides over a shoulder 78a of the lock groove 78. Once the tongue 80a has slid over the shoulder 78a, the tongue 80a snaps downward onto a far edge of the shoulder 78a and resists motion to remove the latch 80 from the lock groove 78. Those skilled in the art would recognize that the splash guard 60 is not required to be locked to the base 12. The snap-fitting of the splash guard 60 to the base 12 provides an adequately secure connection between the two structures. The locking action of the splash guard 60 to the base 12 merely provides further assurance to the user that the two structures will not become separated until so desired by the user.

Figure 7:
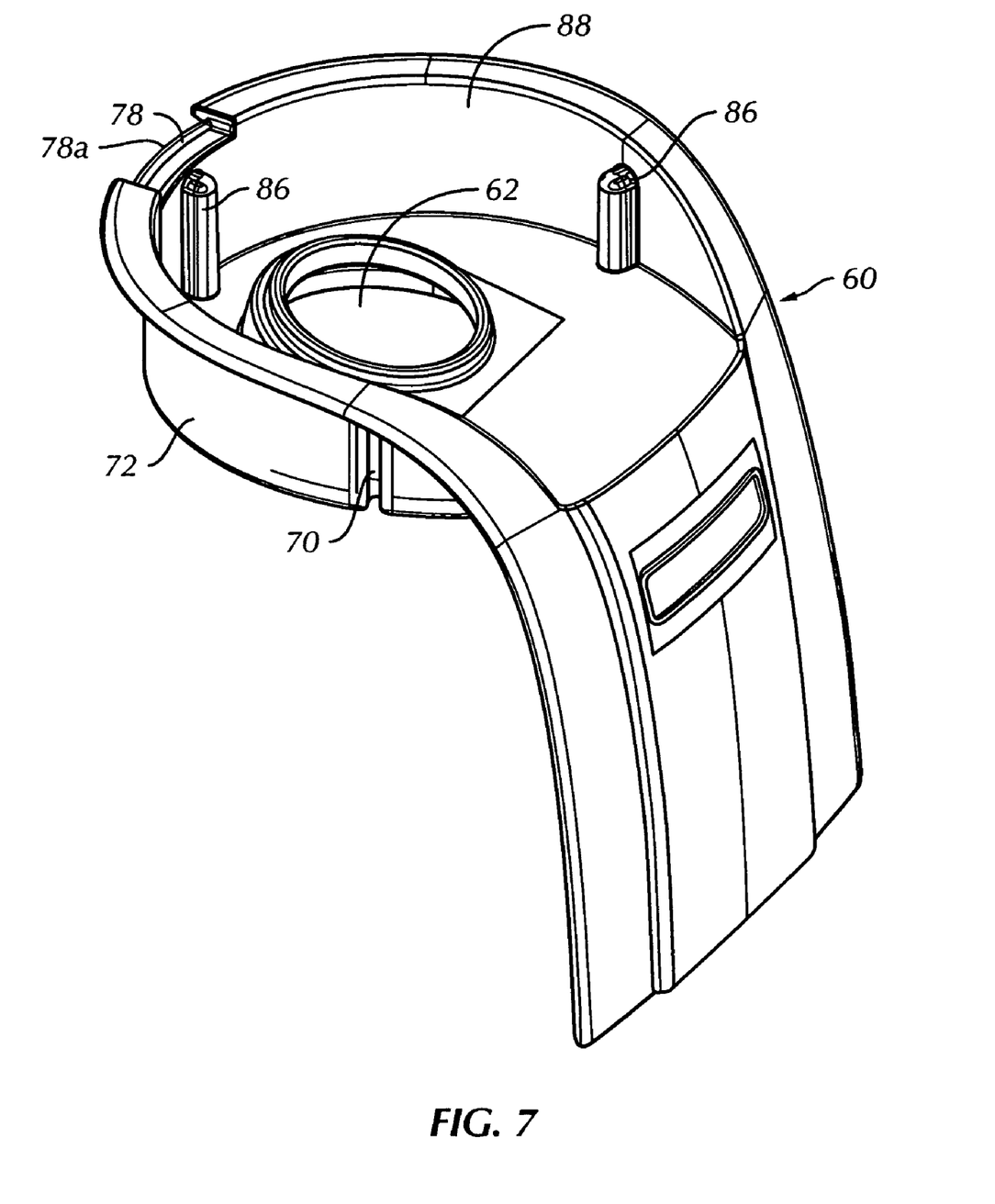
FIG. 7 is a front right perspective view of a splash guard of the mixing device shown in FIG. 1.

In reference to FIGS. 6-7, the outer housing 52 of the collar 32 has three equidistantly spaced vertical alignment grooves 82 on an exterior surface 84 of the collar 32. The vertical alignment grooves 82 of the collar 32 complimentarily engage three vertical alignment ribs 86 on an interior surface 88 of the splash guard 60 when the collar 32 is mounted to the splash guard 60. While three alignment grooves 82 and ribs 86 are preferred, the present invention is not limited to any particular number of grooves 82 and ribs 86.

In operation, when a user desires to removably mount the collar 32 and jar 28 on the splash guard 60, the user aligns the vertical alignment grooves 82 on the exterior surface 84 of the collar 32 with the vertical alignment ribs 86 on the interior surface 88 of the splash guard 60. The collar 32 then slides downward towards the splash guard 60 until coming into abutting contact with the splash guard 60, where the clutch 64 becomes drivingly engaged with the blending tool 94.

Referring now to FIGS. 1, 5 and 10, when the splash guard 60 is in place over the recessed area 26 of the base 12, the storage area 66 is completely enclosed. Various blender components, such as the cap 68, used to enclose the dispensing tube 48 of the collar 32 when the dispensing spout 36 is not in use, can be stored and protected in the storage area 66 of the base 12. Those skilled in the art would recognize that various blender components or spare parts could be stored in the storage area 66, such as an alternate blending tool (not shown). Further, one skilled in the art would recognize that the shape of the storage area 66 could be changed to accommodate different components without departing from the scope of the invention.

Figure 3:
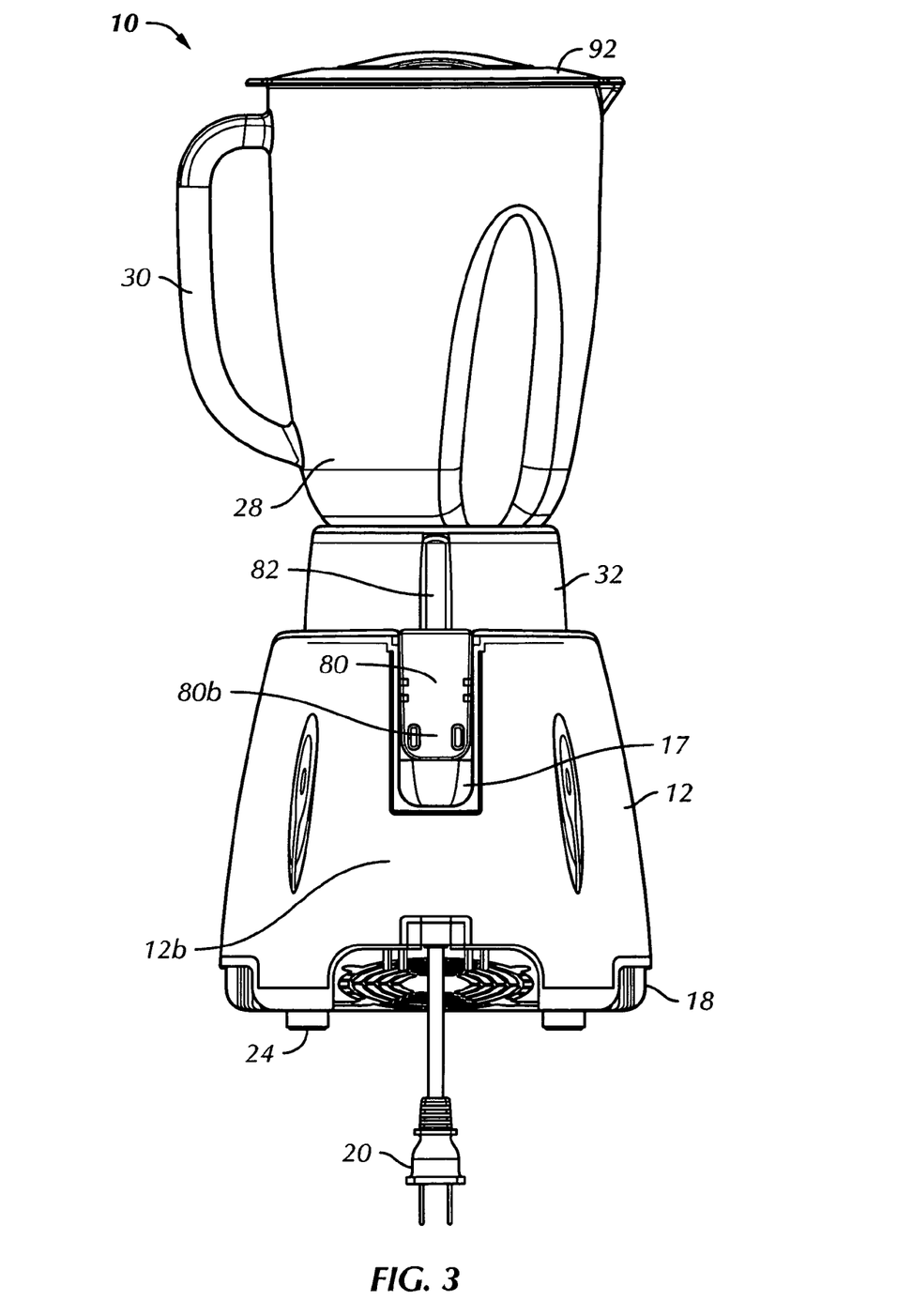
FIG. 3 is a rear elevation view of the mixing device shown in FIG. 1.
Figure 4:
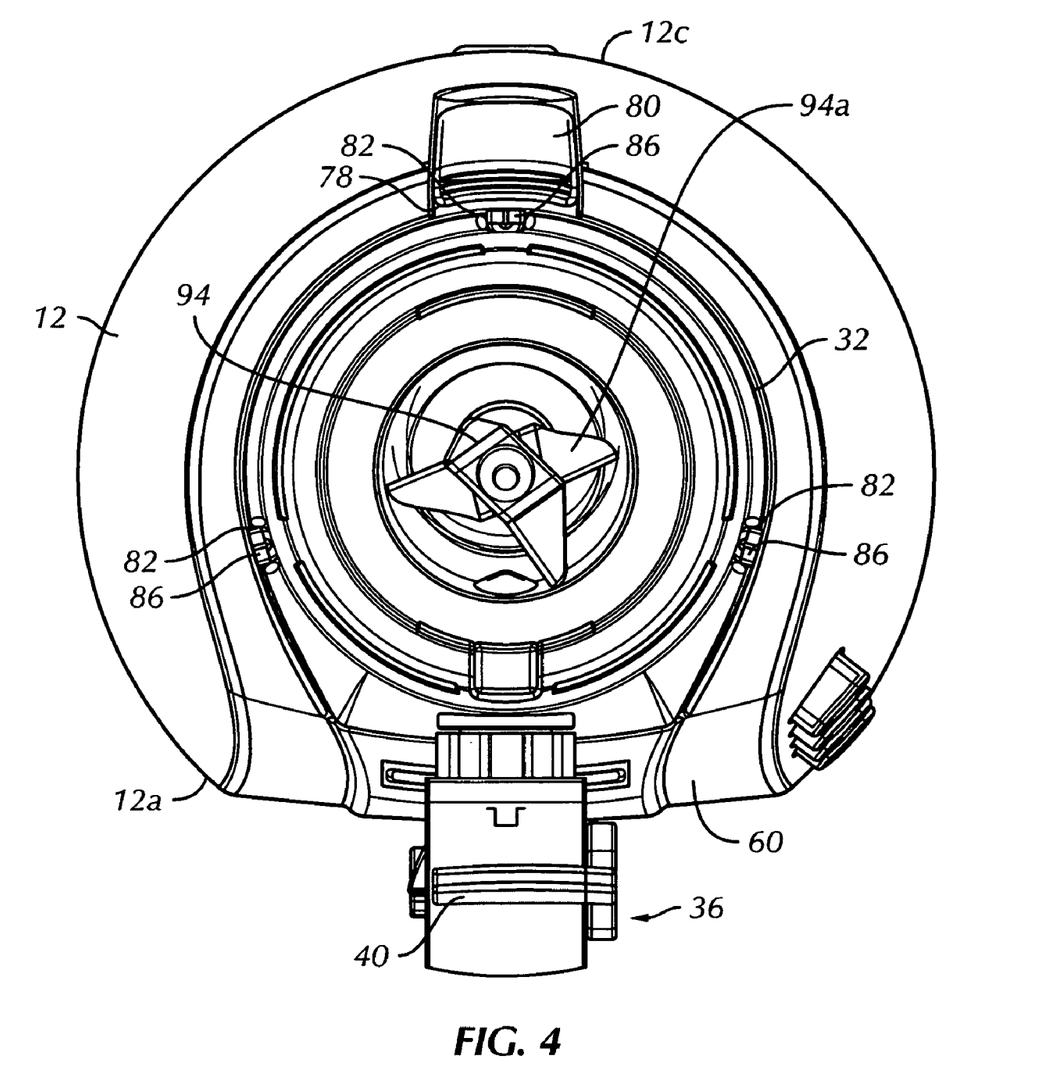
FIG. 4 is a top plan view of a base of the mixing device shown in FIG. 1.
Figure 9:
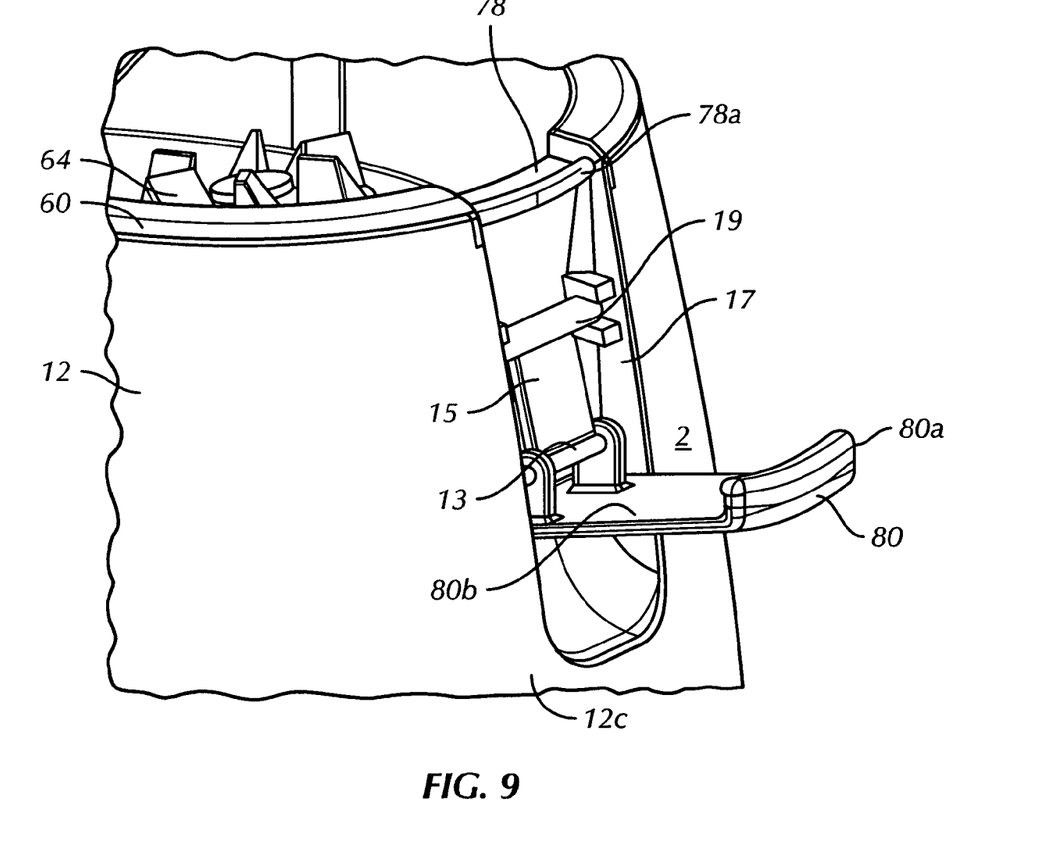
FIG. 9 is a rear perspective view of the base and splash guard assembled.

Referring to FIGS. 3, 4 and 9, the latch 80 located on a back surface 12c of the base 12 is moveable between a first arrangement wherein the latch 80 engages the lock groove 78 of the splash guard 60 to lock the splash guard 60 onto the base 12 and a second arrangement wherein the latch 80 pivots away from the top 12b of the base 12 to disengage the lock groove 78 of the splash guard 60. This movement of the latch 80 allows for easy removal of the splash guard 60 from the base 12. A first end 80b of the latch 80 is secured to a horizontal pin 13 located in a channel 17 in the back surface 12c of the base 12. The horizontal pin 13 is located on a distal end of a tab 15 which is pivotably mounted within the channel 17 by a hinge mechanism 19. The tongue 80a of the latch 80 is located on a second end of the latch 80 opposite the first end 80b. The latch 80 pivots on the horizontal pin 13 at first end 80b to move the second end of the latch 80 with the tongue 80a in a vertical motion to act as an over the center latching mechanism. Those skilled in the art would appreciate that the motion and shape of the pivot arm can be changed without departing from the scope of the invention. For instance, the pivot arm could be spring-biased or include a turning key to more securely lock the latch 80 with the lock groove 78. Further, the latch 80 could be omitted and the splash guard 60 merely snap-fits onto the base 12.

Figure 8:
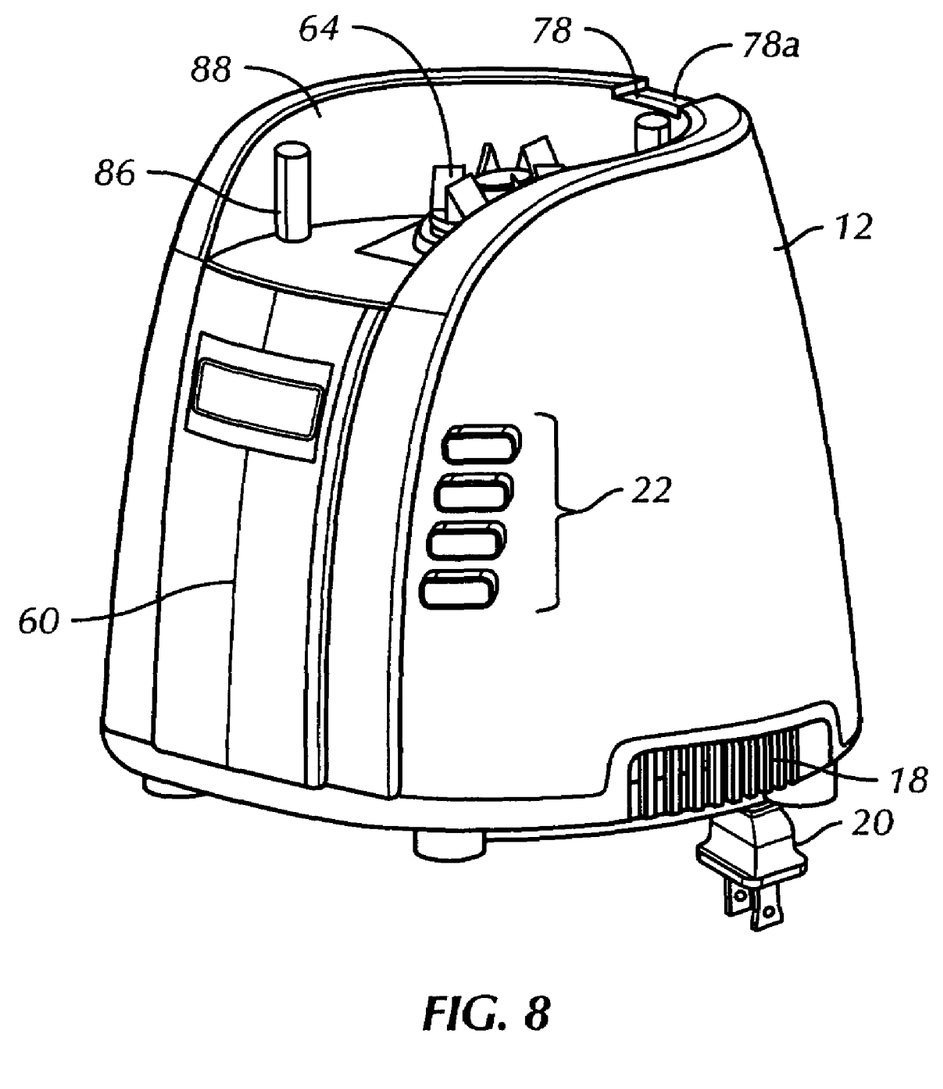
FIG. 8 is a front right perspective view of the base and splash guard assembled.

In operation, when a user desires to operate the mixing device 10 to blend food, the user takes the base 12 and places it on a countertop or tabletop (not shown). The user should make sure that the feet 24 of the mixing device 10 are flush against the top of the countertop or tabletop. The user then takes the splash guard 60, making sure to align the vertical alignment slots 70 with the vertical alignment ridges 74, and removably mounts the splash guard 60 onto the front 12a and top 12b of the base 12 so that the storage area 66 is completely enclosed. When mounting the splash guard 60 to the base 12, the user should make sure that the aligning groove 90 of the base 12 is flush against the exterior perimeter of the splash guard 60. Also, the user should ensure that the hole 62 of the splash guard 60 is directly aligned with the clutch 64 of the base 12. Next, the user pivots the latch 80 located on a back surface 12c of the base 12 upwards to couple with the lock groove 78 of the splash guard 60. The splash guard 60 is now locked into place. When the splash guard 60 has been mounted to the base 12, the configuration will appear as shown in FIG. 8.

The user then mounts the jar 28 to the top of the collar 32. At this point, the user attaches the dispensing spout 36 to the dispensing tube 48 of the collar 32. As previously described, the dispensing spout 36 removably locks onto the locking keys 50 of the dispensing tube 48 of the collar 32 via the fastening mechanism (not shown) with a one-quarter twist engagement. Next, the gate valve 38 is inserted into the dispensing spout 36 as previously mentioned. Before the beginning to blend foodstuff, the user should ensure that the handle 40 is in the upper most position towards the jar 28 so that the gate valve 38 is in the closed position. This prevents the blended foodstuff from escaping from the blender. Next, the user mounts the collar 32 to the top of the splash guard 60. In order to properly align the collar 32 with the splash guard 60, the vertical alignment grooves 82 on the exterior surface 84 of the collar 32 are aligned with the vertical alignment ribs 86 of the splash guard 60. The collar 32 is then slid downward until it reaches abutting contact with the splash guard 60. Once the user has properly connected the outlet cord 20 of the base 12 to an outlet (not shown), the mixing device 10 is ready to blend food.

It is understood by those skilled in the art that the cap 68 located in the recessed area 26 of the base 12 can be used to cover the end of the dispensing tube 48 of the collar 32. The cap 68 can engage or disengage the dispensing tube 48 in a similar manner in which the dispensing spout 36 is attached to the end of the dispensing tube 48. To attach the cap 68 to the dispensing tube 48, a user rotates the cap 68 with a one-quarter twist so that a fastening mechanism (not shown) on the interior of the cap 68 engage the locking keys 50 on the exterior periphery of the dispensing tube 48. This configuration allows a user to blend food in the mixing device without the option of dispensing the blended food through the dispensing spout 36. Those skilled in the art would also understand that various other blender components, such as tools or extra blending instruments, can be stored in a storage area 66 of the base 12.

When a user has completed blending food in the mixing device 10, the user can dispense the blended food via the dispensing spout 36. During this operation, the blended food flows from the jar 28 down through the collar 32, through the dispensing tube 48 into the first end of the dispensing spout 36 through the gate valve 38 and out the second end of the dispensing spout 36. To prevent food from flowing through this process, a user can take the handle 40 of the gate valve 38 and move it in an upward direction towards the jar 28. In this configuration, the dispensing groove 46 is not aligned with the dispensing tube 48 of the collar 32. Because these two structures are out of alignment, food is prohibited from flowing from the dispensing tube 48 through the gate valve 38.

When the user is finished using the mixing device 10, and is ready to begin clean up and preparation for storage of the mixing device 10, the various components of the mixing device 10 can be easily separated and removed to assist the user in clean up. First, the user would remove the jar 28 from the top of the collar 32. Next, the collar 32 is removed from the splash guard 60 in a vertical direction. The splash guard 60 is then removed from the front 12a and top 12b of the base 12 in a vertical direction. The splash guard 60 can now be easily cleaned separate from the other parts of the mixing device 10. Further, because the jar 28, collar 32 and splash guard 60 are separable and constructed of durable, lightweight material, all three items are capable of being cleaned in a dishwasher. In normal use, the base 12 of the mixing device 10 should not need extensive cleaning because the splash guard 60 will accumulate most of the errant blended food.

To clean the gate valve 38, the user moves the handle 40 of the gate valve 38 away from the jar 28 as shown in FIG. 12. When the alignment key 44 of the gate valve 38 reaches the key slot 58 of the dispensing spout 36, the user can easily remove the gate valve 38 from the valve bore 54 of the dispensing spout 36 by sliding the gate valve 38 axially out of the dispensing spout 36. The gate valve 38 can now be easily cleaned as it is separated from the rest of the mixing device 10. Specifically, the dispensing groove 46 of the gate valve 38 is exposed to permit the user to easily clean the interior of the gate valve 38. Alternatively, the user can place the gate valve 38 into a dishwasher for cleaning.

To clean the dispensing spout 36, the user removes the dispensing spout 36 from the dispensing tube 48 of the collar 32. This is accomplished by rotating the dispensing spout 36 so that the fastening mechanism (not shown) no longer engages the locking keys 50 on the exterior periphery of the dispensing tube 48. The dispensing spout 36 can now be easily cleaned as it is separated form the rest of the mixing device 10 structure. Specifically, the interior surfaces of the dispensing spout 36 are exposed to allow the user to directly clean the interior of the dispensing spout 36. Alternatively, the user can place the dispensing spout 36 into a dishwasher for easy cleaning.

It will be appreciated by those skilled in the art that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

We claim:

1. A mixing device configured to blend food, the device comprising:

a) a base housing a motor;

b) a jar removably mounted to said base for containing food; and c) a collar removably mounted between said base and said jar, an interior of said collar including a series of threads for securing said collar to a bottom of said jar, a dispensing tube projecting outwardly beyond an outer sidewall of said collar, a first end of the dispensing tube being in fluid communication with said collar and said jar and an opposite second end of the dispensing tube including an outlet, said dispensing tube including locking keys projecting outwardly from an exterior sidewall thereof between said first and second ends, said collar including a blending tool operatively engaged with said motor when positioned on said base;

d) a dispensing spout removably mounted to said dispensing tube via the locking keys, said dispensing spout having an inlet and an outlet, said dispensing spout including a gate valve positioned therein between said inlet and outlet and movable between a first position wherein food flows through said inlet, gate valve and outlet and a second position wherein food is prevented from flowing through said inlet, gate valve and outlet, said inlet of said dispensing spout being sized and shaped to receive at least a portion of the dispensing tube therein, said gate valve being removable from said dispensing spout.

2. A device in accordance with claim 1, further including a dispensing handle secured to said gate valve for moving said gate valve between said first and second positions.

3. A device in accordance with claim 2, wherein said gate valve is removably retained in the dispensing spout with a key and slot arrangement.

4. A device in accordance with claim 1, wherein a valve bore extends across a width of said dispensing spout, an arcuate stopper rib is positioned at a periphery of one side of said valve bore, and a radially extending key slot extends outwardly from a periphery of said valve bore.

5. A device in accordance with claim 4, wherein the gate valve includes a generally cylindrical seat sized to complementary fit within the valve bore, and wherein a pair of spaced-apart O-rings are positioned around the seat to sealingly position the seat within the valve bore.

6. A device in accordance with claim 5, wherein a hub extends outwardly from one side of the seat and an alignment key extends from a peripheral edge of the hub.

7. A device in accordance with claim 6, wherein the alignment key is aligned with the key slot to assemble the gate valve in the dispensing spout.

8. A device in accordance with claim 7, wherein the alignment key abuts the annular stopper rib when the gate valve is in the second position.

9. A device in accordance with claim 6, wherein a handle extends outwardly from the seat at an opposite end from the hub.

10. A device in accordance with claim 9, wherein to remove the gate valve from the dispensing spout the handle is rotated until the alignment key is aligned with the key slot, and then the gate valve is moved axially out of the dispensing spout.

\* \* \* \* \*